United States Patent [19]

Gillett, Jr. et al.

[11] Patent Number: 4,937,733
[45] Date of Patent: Jun. 26, 1990

[54] METHOD AND APPARATUS FOR ASSURING ADEQUATE ACCESS TO SYSTEM RESOURCES BY PROCESSORS IN A MULTIPROCESSOR COMPUTER SYSTEM

[75] Inventors: Richard B. Gillett, Jr., Westford; Douglas D. Williams, Pepperell, both of Mass.

[73] Assignee: Digital Equipment Corporation, Maynard, Mass.

[21] Appl. No.: 44,952

[22] Filed: May 1, 1987

[51] Int. Cl.$^5$ ............................ G06F 9/18; G06F 15/16
[52] U.S. Cl. ................................ 364/200; 364/240; 364/240.9; 364/243.5; 364/228.3
[58] Field of Search ... 364/200 MS File, 900 MS File

[56] References Cited

U.S. PATENT DOCUMENTS

| | | |
|---|---|---|
| 3,398,405 | 8/1968 | Carlson et al. . |
| 3,528,061 | 9/1970 | Zurcher, Jr. . |
| 3,611,303 | 10/1971 | Serracchioli et al. . |
| 3,701,109 | 10/1972 | Peters ............................ 340/825.51 |
| 3,761,883 | 9/1973 | Alvarez et al. . |
| 3,916,384 | 10/1975 | Fleming et al. . |
| 3,947,324 | 3/1976 | Doehle et al. ................... 435/192 |
| 3,993,981 | 11/1976 | Cassarino et al. . |
| 3,997,875 | 12/1976 | Broeren . |
| 4,000,485 | 12/1976 | Barlow et al. . |
| 4,050,059 | 9/1977 | Williams et al. . |
| 4,055,851 | 10/1977 | Jenkins et al. . |
| 4,075,692 | 2/1978 | Sorenson et al. . |
| 4,096,561 | 6/1978 | Trinchieri ........................ 364/200 |
| 4,099,243 | 7/1978 | Palumbo . |
| 4,106,104 | 8/1978 | Nitta et al. ...................... 364/900 |
| 4,148,011 | 4/1979 | McLagan et al. ................ 340/825.5 |
| 4,162,529 | 7/1979 | Suzuki et al. .................... 364/200 |
| 4,214,304 | 7/1980 | Shimizu et al. . |
| 4,229,791 | 10/1980 | Levy et al. ....................... 364/200 |
| 4,296,466 | 10/1981 | Guyer et al. . |
| 4,313,161 | 1/1982 | Hardin et al. . |
| 4,373,183 | 2/1983 | Means et al. .................... 364/200 |
| 4,400,771 | 8/1983 | Suzuki et al. .................... 364/200 |
| 4,402,040 | 8/1983 | Evett ................................ 364/200 |
| 4,423,384 | 12/1983 | DeBock ........................... 328/152 |
| 4,480,307 | 10/1984 | Budde et al. .................... 364/200 |
| 4,481,573 | 11/1984 | Fukunaga et al. . |
| 4,488,217 | 12/1984 | Binder et al. .................... 364/200 |
| 4,546,450 | 10/1985 | Kanuma ........................... 364/900 |
| 4,564,838 | 1/1986 | Boulogne et al. ............... 340/825.5 |
| 4,568,930 | 2/1986 | Livingston et al. ............. 340/825.5 |
| 4,574,350 | 3/1986 | Starr ................................ 364/200 |
| 4,587,609 | 5/1986 | Boudreau et al. . |
| 4,594,590 | 6/1986 | Van Hatten et al. ............ 340/825.5 |
| 4,621,318 | 11/1986 | Maeda ............................. 364/200 |
| 4,626,843 | 12/1986 | Szeto et al. . |
| 4,660,169 | 4/1987 | Norgren et al. . |
| 4,665,484 | 5/1987 | Nanba .............................. 364/200 |
| 4,698,753 | 10/1987 | Hubbins et al. . |
| 4,706,190 | 11/1987 | Bomba et al. . |

*Primary Examiner*—Raulfe B. Zache
*Assistant Examiner*—Glenn Richman
*Attorney, Agent, or Firm*—Finnegan, Henderson, Farabow, Garrett and Dunner

[57] ABSTRACT

A multiple node computer system includes processor nodes, memory nodes, and input/output nodes interconnected on a pended bus. The system includes a lockout indicator which is set upon receipt of a locked response message by a processor node from a memory node in response to an interlock read command. The processors include a lockout check circuit responsive to the condition of the lockout indicator and will restrict generation of additional interlock read commands according to a predetermined access gating criterion until the lockout indicator is reset. In this manner, processor nodes of the system are assured equitable access to a memory node..

16 Claims, 9 Drawing Sheets

FIG. 10.

| | Node | Cmd | Function Response Message | Nodes Asserting Lockout Indicator | 15 | Node status at end of transaction 7 | 6 | 2 | Note |
|---|---|---|---|---|---|---|---|---|---|
| 0 | | | | | IRG | IRG | IRG | idle | Nodes 15,7,6 all want to access the same memory location. |
| 1 | 15 | IR | GRD | — | UWG | IRG | IRG | idle | Nodes 15 gets to the bus first and locks the location. |
| 2 | 7 | IR | LOC | 7 | UWG | IRG | IRG | idle | Node 7 gets a LOC response and asserts lockout activator. |
| 3 | 6 | IR | LOC | 7,6 | UWG | IRG | IRG | idle | Node 6 gets a LOC response and asserts lockout activator. |
| 4 | 15 | UW | — | 7,6 | idle | IRG | IRG | IRW | Node 15 completes its interlock sequence. Node 2 now wants access to the same memory location but enters IRWAIT since lockout indicator is asserted. |
| 5 | 7 | IR | GRD | 6 | idle | UWG | IRG | IRW | Node 7 gets the lock and deasserts its lockout activator. Lockout indicator remains asserted due to Node 6's assertion. |
| 6 | 6 | IR | LOC | 6 | IRW | UWG | IRG | IRW | Node 6 gets another LOC response. Node 15 wants to perform another interlock sequence but this will not start until lockout indicator deasserts. |
| 7 | 7 | UW | — | 6 | IRW | idle | IRG | IRW | Node 7 completes its interlock sequence. |
| 8 | 6 | IR | GRD | — | IRG | idle | UWG | IRG | Node 6 finally sets a lock bit and deasserts its lockout activator. Lockout indicator now deasserts since Node 6 was the last active lockout activator. |
| 9 | 6 | UW | — | — | IRG | idle | idle | IRG | Node 6 completes its interlock sequence. |

KEY:

IRW – Interlock Read Wait State     Transaction Generation States (TG)     LOC – locked response on function lines
                                     IRG – Interlock Read Generate State    GRD – valid read data response
                                     UWG – Unlock Write Generate State

METHOD AND APPARATUS FOR ASSURING ADEQUATE ACCESS TO SYSTEM RESOURCES BY PROCESSORS IN A MULTIPROCESSOR COMPUTER SYSTEM

I. CROSS REFERENCES TO RELATED APPLICATIONS

The invention is related to copending U.S. Pat. Application Ser. No. 07/045,043, COMMANDER NODE METHOD AND APPARATUS FOR ASSURING ADEQUATE ACCESS TO SYSTEM RESOURCES IN A MULTIPROCESSOR COMPUTER SYSTEM, filed Apr. 24, 1987.

II. BACKGROUND OF THE INVENTION

The invention relates to computer systems and, more particularly, to computer systems having multiple processors interconnected by a bus and having the capability to initiate an access command to a resource.

Modern computer system have multiple processors, memory resources, and input/output (I/0) devices interconnected by a common bus to achieve high total computational power. Such construction can provide very powerful systems capable of executing many millions of instructions per second. However, the interconnection of multiple processors can create difficulties when multiple processors simultaneously attempt to access memory or I/0 resources. For example, problems can develop when several processors each attempt a read-modify-write (RMW) operation. In an RMW operation, one processor retrieves data from a memory location, performs an operation on the data, and writes the modified data back to the original memory location. Unpredictable results affecting system integrity can occur if one processor has started an RMW operation for one memory location, and a second processor attempts an RMW operation for the same memory location in the time period between the "read" operation of the first processor's RMW operation and the 'write' portion of that RMW operation.

One way to prevent multiple processors from performing RMW operations on the same memory locations is to provide an exclusive access command such as an "interlock read" command. This involves the use of a "lock" indicator, such as a lock bit, which is set when the "read" portion of an RMW operation is performed and which is reset after the "write" portion of the RMW operation is completed. A second processor attempting to initiate an RMW operation on a location in memory when the lock bit is set will cause the memory to return lock status information. The lock status information indicates to the processor that the second interlock read command was not accepted by the memory.

The interlock read operation alleviates problems caused by multiple processors each attempting to perform an RMW operation. Processors are granted equitable access to the bus for such interlock read operations by arbitration processes using, for example, a round-robin algorithm. However, performance bottlenecks can still occur. For example, under certain bus traffic conditions, a specific processor may repeatedly encounter locked memory locations and will be unable to obtain needed access to memory resources in a timely manner. Such problems are reduced by providing multiple lock bits for a memory module with each lock bit associated with a portion of the memory module rather than with the whole memory module. Such multiple lock bits provide finer "granularity" of interlocked read operations on a memory module, tying up a smaller portion of memory after an interlock read operation. A system including multiple lock bits is described in copending U.S. Pat. application, Ser. No. 07/044,954.

This solution also permits a higher success rate of RMW operations, thus improving system throughput. However, under certain conditions, selected processors can still encounter memory access problems. Bus arbitration can assist nodes to obtain adequate access to the system bus by providing such nodes with equitable access to the system bus. However, under certain conditions, such equitable bus access does not insure adequate access to the memory itself. For example, two or more processors performing interlock read commands at the same time can become synchronized with interlock read commands from other nodes in such a way that certain processors only present commands to the memory at times when memory has been locked by other nodes, such that those processors are effectively denied access to the memory resource.

A second example involving prolonged denial of system resources on a multiple processor system is when multiple processors attempt to access an I/0 bus at a higher rate than an I/0 adapter can serve such requests. The input queue of the I/0 adapter thus rapidly fills, resulting in "no acknowledge" (NACK) indications to processors attempting to subsequently access the I/0 bus.

Although the preceding discussion has emphasized the operation of a computer system employing processor nodes, memory nodes, and I/0 nodes, a more general discussion of such a system is in the terms of commander nodes, that is, nodes which initiate a transaction on a bus, and responder nodes, that is, nodes which respond to a transaction initiated by a commander node. At various times, a single device can function as either a commander node or a responder node.

II. SUMMARY OF THE INVENTION

It is therefore an object of the present invention to provide a multiprocessor system in which all processors are granted adequate access to system resources.

It is a further object of the present invention to provide a multiprocessor system having interlock read commands in which all processors are guaranteed access to memory resources.

It is a further object of the invention to provide a multiprocessor system in which interlock read commands are inhibited when processors are denied access to memory due to repeated lock response messages.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

The present invention overcomes the problems and disadvantages of the prior art by responding to a resource denial indicatiOn received by a processor to limit generation of.commands which would place additional demands on a system resource until the resource can provide adequate service to the processor which received the resource denial indication.

To achieve the objects and in accordance with the purpose of the invention, as embodied and broadly described herein, there is provided a multiple node data processing system for assuring equitable access to a resource node by other nodes, connected to a bus, generating access commands to gain access to the resource node. The system comprises a resource node functioning as a responder node. The resource node includes means for processing the access commands and means for transmitting a resource denial indication when the processing means is prevented from responding to the access commands. The system also comprises a plurality of nodes each functioning as a commander node, and each including means for transmitting the access commands over the bus to the resource node.

The system further comprises a lockout indicator connected to one of the commander nodes and operable, in response to the resource denial indication according to a predetermined lockout assertion criterion, between an asserted condition and an unasserted condition; and lockout check means for monitoring the lockout indicator and for preventing generation of access commands to the resource node according to a predetermined access gating criterion when the lockout indicator is in the asserted condition.

The accompanying drawings, which are incorporated in and constitute a part of this specification, illustrate one embodiment of the invention, and, together with the description, serve to explain the principles of the present invention.

IV. BRIEF DESCRIPTION OF THE DRAWINGS

FIG. 10 is an example of a series of access command transactions illustrating the present invention.

V. DETAILED DESCRIPTION OF THE PREFERRED EMBODIMENT

Reference will now be made in detail to a preferred embodiment of the invention, an example of which is illustrated in the accompanying drawings.

A. System Overview

Figure 1:
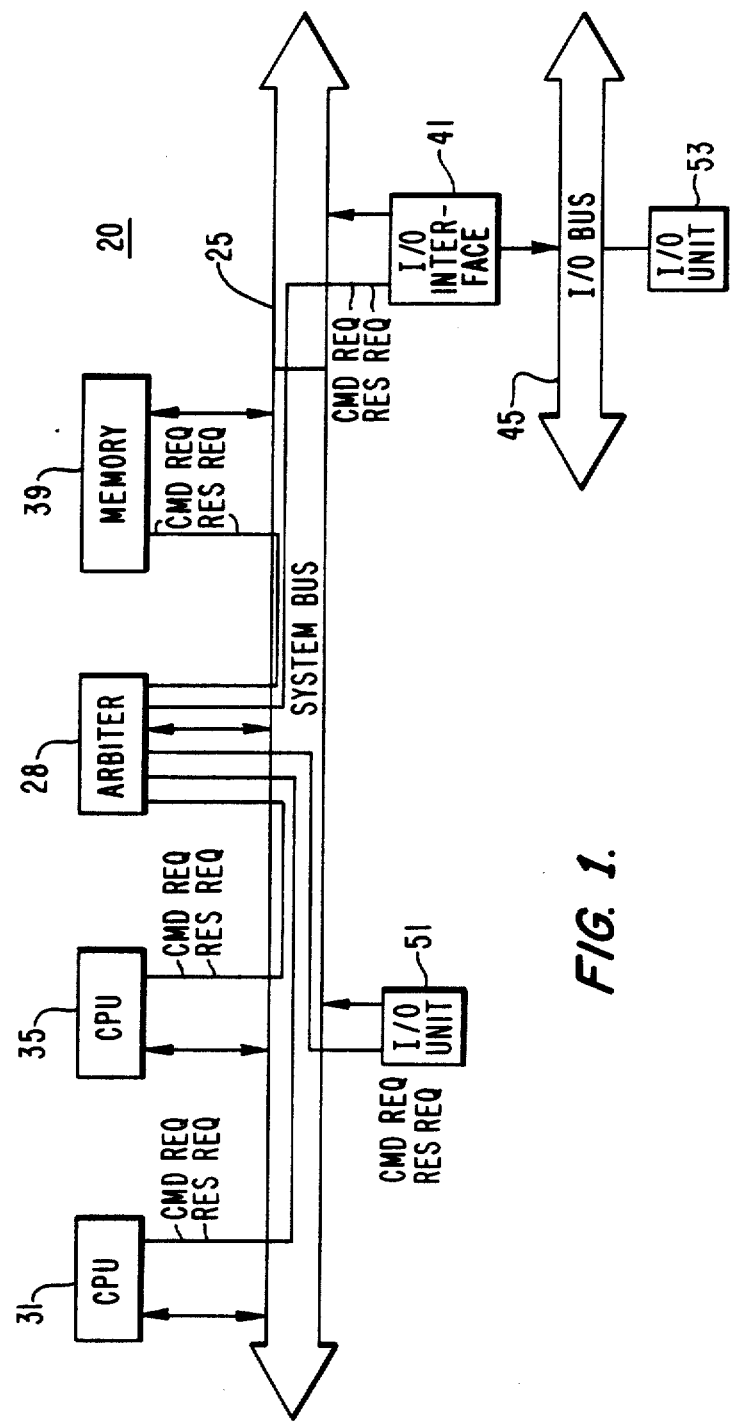
FIG. 1 is a block diagram of a data processing system embodying the present invention.

FIG. 1 shows an example of a data processing system 20 which embodies the present invention. The heart of system 20 is a system bus 25 which is a synchronous bus that allows communication between several processors, memory subsystems, and I/O systems. Communications over system bus 25 occur synchronously using periodic bus cycles. A typical bus cycle time for system bus 25 is 64 nsec.

In FIG. 1, system bus 25 is coupled to two processors 31 and 35, a memory 39, one I/O interface 41 and one I/O unit 51. I/O unit 53, is coupled to system bus 25 by way of I/O bus 45 and I/O unit interface 41.

A central arbiter 28 is also connected to system bus 25 in the preferred embodiment of data processing system 20. Arbiter 28 provides certain timing and bus arbitration signals directly to the other devices on system bus 25 and shares some signals with those devices.

The implementation shown in FIG. 1 is one which is presently preferred and should not necessarily be interpreted as limiting the present invention. For example, I/O unit 53 could be coupled directly to system bus 25, and arbiter 28 need not operate in the manner described for the present invention.

In the nomenclature used to describe the present invention, processors 31 and 35, memory 39, and I/O interface 41, and I/O device 51 are all called nodes. A "node" is defined as a hardware device which connects to system bus 25. A typical node 60 is shown in greater detail in FIG. 2.

According to the nomenclature used to describe the present invention, the terms "signals" or "lines" are mainly used interchangeably to refer to the names of the physical wires. The terms "data" or "levels" are mainly used to refer to the values which the signals or lines can assume.

Nodes perform transfers with other nodes over system bus 25. A "transfer" is one or more contiguous cycles that share a common transmitter and common arbitration. For example, a read operation initiated by one node to obtain information from another node on system bus 25 requires a command transfer from the first to the second node followed by one or more return data transfers from the second node to the first node at some later time.

A "transaction" is defined as the complete logical task being performed on system bus 25 and can include more than one transfer. For example, a read operation consisting of a command transfer followed later by one or more return data transfers is one transaction. In the preferred embodiment of system bus 25, the permissible transactions support the transfer of different data lengths and include read, write (masked), interlock read, unlock write, and interrupt operations. The difference between an interlock read and a regular or noninterlock read is that an interlock read to a specific location retrieves information stored at that location and restricts access to the stored information by subsequent interlock read commands. Access restriction is performed by setting a lock mechanism. A subsequent unlock write command stores information in the specified location and restores access to the stored information by resetting the lock mechanism at that location. Thus, the interlock read/unlock write operations are a form of read-modify-write operation.

Since system bus 25 is a "pended" bus, it fosters efficient use of bus resources by allowing other nodes to use bus cycles which otherwise would have been wasted waiting for responses. In a pended bus, after one node initiates a transaction, other nodes can have access to the bus before that transaction is complete. Thus, the node initiating that transaction does not tie up the bus for the entire transaction time. This contrasts with a non-pended bus in which the bus is tied up for an entire transaction. For example in system bus 25, after a node initiates a read transaction and makes a command transfer, the node to which that command transfer is directed may not be able to return the requested data immediately. Cycles on bus 25 would then be available between the command transfer and the return data transfer of the read transaction. System bus 25 allows other nodes to use those cycles.

In using system bus 25, each of the nodes can assume different roles in order to effect the transfer of information. One of those roles is a "commander" which is defined as a node which has initiated a transaction currently in progress. For example, in a write or read operation, the commander is the node that requested the write or read operation; it is not necessarily the node that sends or receives the data. In the preferred protocol for system bus 25, a node remains as the commander throughout an entire transaction even though another node may take ownership of the system bus 25 during certain cycles of the transaction. For example, although one node has control of system bus 25 during the transfer of data in response to the command transfer of a read transaction, that one node does not become the commander of the bus 25. Instead, this node is called a "responder."

A responder responds to the commander. For example, if a commander initiated a write operation to write data from node A to node B, node B would be the responder. In addition, in data processing system 20 a node can simultaneously be a commander and a responder.

Transmitters and receivers are roles which the nodes assume in an individual transfer. A "transmitter" is defined as a node which is the source of information placed on system bus 25 during a transfer. A "receiver" is the complement of the transmitter and is defined as the node which receives the information placed on system bus 25 during a transfer. During a read transaction, for example, a commander can first be a transmitter during the command transfer and then a receiver during the return data transfer.

When a node connected to system bus 25 desires to become a transmitter on system bus 25, that node asserts one of two request lines, CMD REQ (commander request) and RES REQ (responder request), which are connected between central arbiter 28 and that particular node. The CMD REQ and RES REQ lines are shown generally in FIG. 1. In general, a node uses its CMD REQ line to request to become commander and initiate transactions on system bus 25, and a node uses its RES REQ line to become a responder to return data or message to a commander. Generally, central arbiter 28 detects which nodes desire access to the bus (i.e., which request lines are asserted). The arbiter then responds to one of the asserted request lines to grant the corresponding node access to bus 25 according to a priority algorithm. In the preferred embodiment, arbiter 28 maintains two independent, circular queues: one for the commander requests and one for the responder requests. Preferably, the responder requests have a higher priority than the commander requests and are handled before the commander requests.

The commander request lines and responder request lines are considered to be arbitration signals. As illustrated in FIG. 1, and as will be explained in greater detail in the description of FIG. 6, arbitration signals also include point-to-point conditional grant signals from central arbiter 28 to each node, system bus extend signals to implement multi-bus cycle transfers, and system bus suppression signals to control the initiation of new bus transactions when, for example, a node such as memory is momentarily unable to keep up with traffic on the system bus.

Other types of signals which can constitute system bus 25 include information transfer signals, respond signals, control signals, console/front panel signals, and a few miscellaneous signals. Information transfer signals include data signals, function signals which represent the function being performed on the system bus 25 during a current cycle, identifier signals identifying the commander, and parity signals. The respond signals generally include acknowledge or confirmation signals from a receiver to notify the transmitter of the status of the data transfer.

Control signals include clock signals, warning signals, such as those identifying low line voltages or low DC voltages, reset signals used during initialization, node failure signals, default signals used during idle bus cycles, and error default signals. The console/front panel signals include signals to transmit and receive serial data to a system console, boot signals to control the behavior of a boot processor during power-up, signals to enable modification of the erasable PROM of processors 31, 35 on system bus 25, a signal to control a RUN LIGHT on the front panel, and signals providing battery power to clock logic on certain nodes. The miscellaneous signals, in addition to spare signals, include identification signals which allow each node to define its identification code.

Figure 2:
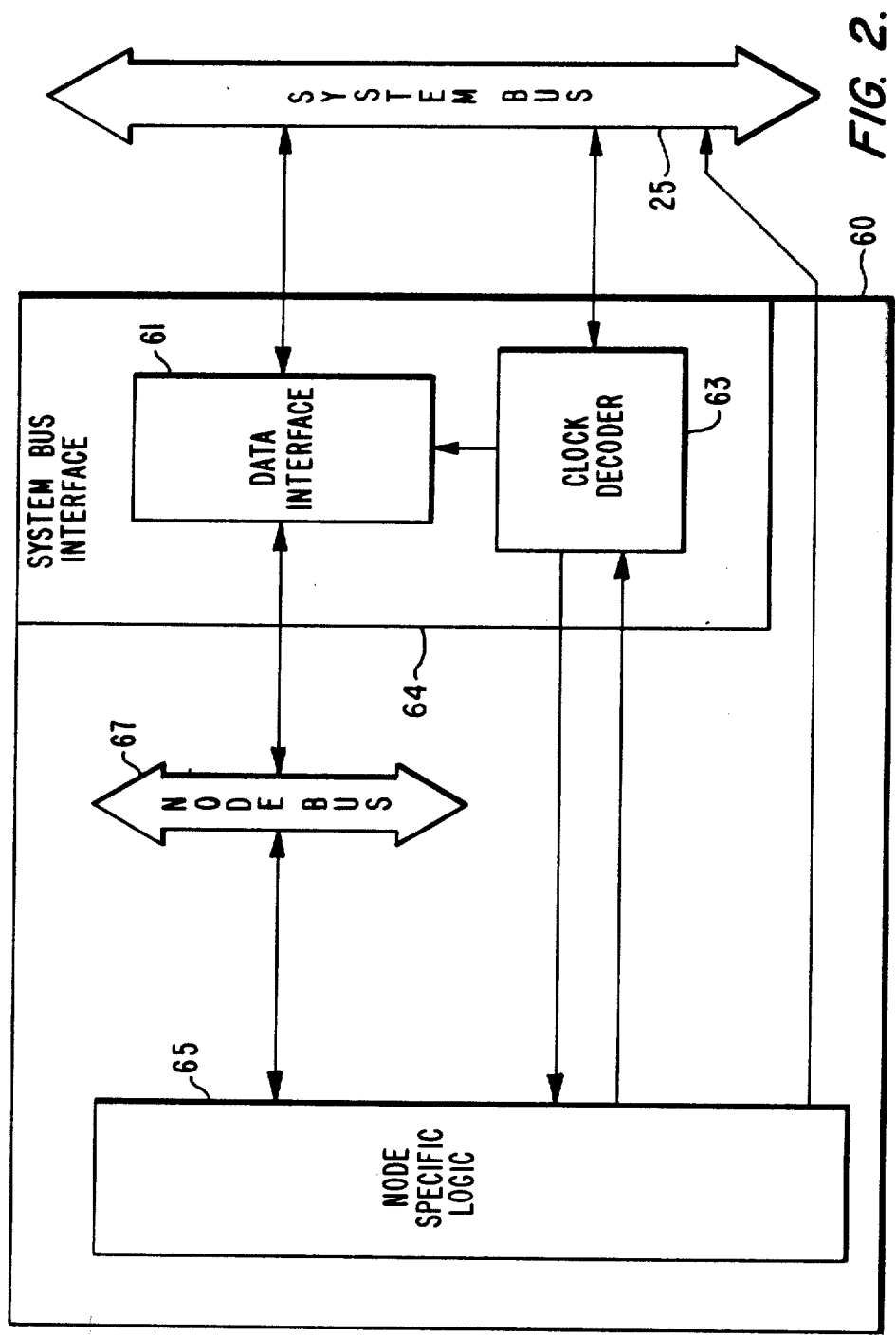
FIG. 2 is a block diagram of a node coupled to the bus in the data processing system of FIG. 1.

FIG. 2 shows an example of a node 60 connected to system bus 25. Node 60 could be a processor, a memory, an I/0 unit or an I/0 interface, as shown in FIG. 1. In the example shown in FIG. 2, node 60 includes node specific logic 65, a node bus 67, and a system bus interface 64 containing a data interface 61 and a clock decoder 63. Preferably, data interface 61, clock decoder 63, and node bus 67 are standard elements for nodes connected to system bus 25. The node specific logic 65, which uses different integrated circuits from system bus interface 64, preferably includes, in addition to the circuitry designed by a user to carry out the specific function of a node, standard circuitry to interface with the node bus 67. In general, data interface 61 is the primary logical and electrical interface between node 60 and system bus 25, clock decoder 63 provides timing signals to node 60 based on centrally generated clock signals, and node bus 67 provides a high speed interface between data interface 61 and node specific logic 65.

In the preferred embodiment of node 60 and system bus interface 64 shown in FIG. 2, clock decoder 63 contains control circuitry for forming signals to be placed on system bus 25 and processes clock signals received from central arbiter 28 to obtain timing signals for node specific logic 65 and data interface 61. Since the timing signals obtained by clock decoder 63 from central arbiter 28 (FIG. 1) use the centrally generated clock signals, node 60 will operate synchronously with system bus 25.

Figure 3:
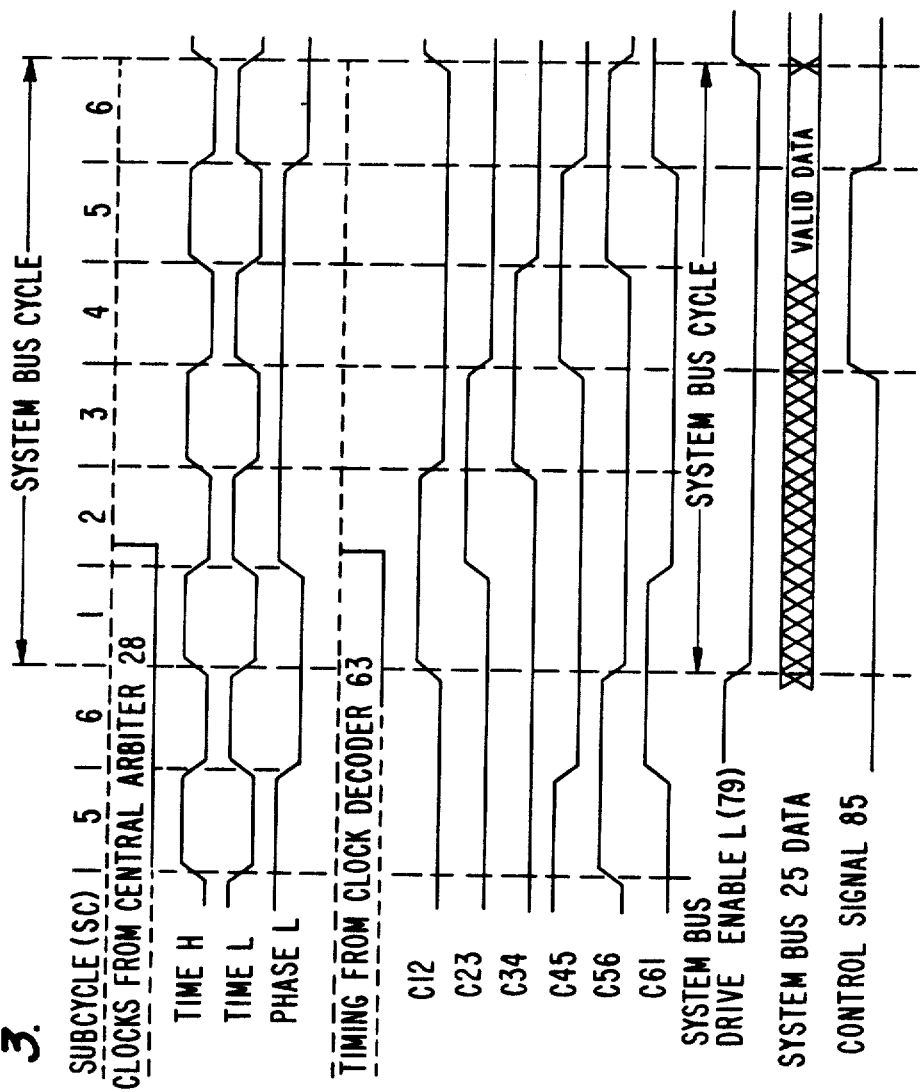
FIG. 3 is a representative timing diagram showing timing signals used in the data processing system of FIG. 1.

FIG. 3 is a timing diagram showing one bus cycle, the clock signals received by clock decoder 63, and certain of the timing signals generated by clock decoder 63. The clock signals received by clock decoder 63 include a Time H signal, a Time L signal, and a Phase signal as shown in FIG. 3. Time H and Time L are inverses of the fundamental clock signals and the Phase signal is obtained by dividing the fundamental clock signal by three. The timing signals generated by clock decoder 63 include C12, C23, C34, C45, C56 and C61, all of which are shown in FIG. 3. Those timing signals required by data interface 61, which occur once per bus cycle, are provided to data interface 61, and a complete set of timing signals, including equivalent ones of the timing signals provided to data interface 61, is buffered and provided to the node specific logic 65. The purpose of buffering is to insure that node specific logic 65 cannot adversely affect the operation of the system bus interface 64 by improperly loading the timing signals. Clock decoder 63 uses the clock signals to create six subcycles for each bus cycle and then uses the subcycles to create the six timing signals CXY, where X and Y represent two adjacent subcycles which are combined to form one timing signal.

Each node in the system bus 25 has its own corresponding set of timing signals generated by its clock decoder 63. While nominally the corresponding signals occur at exactly the same time in every node throughout the system 20, variations between clock decoder 63 and other circuitry in multiple nodes introduce timing variations between corresponding signals. These timing variations are commonly known as "clock skew."

Figure 4:
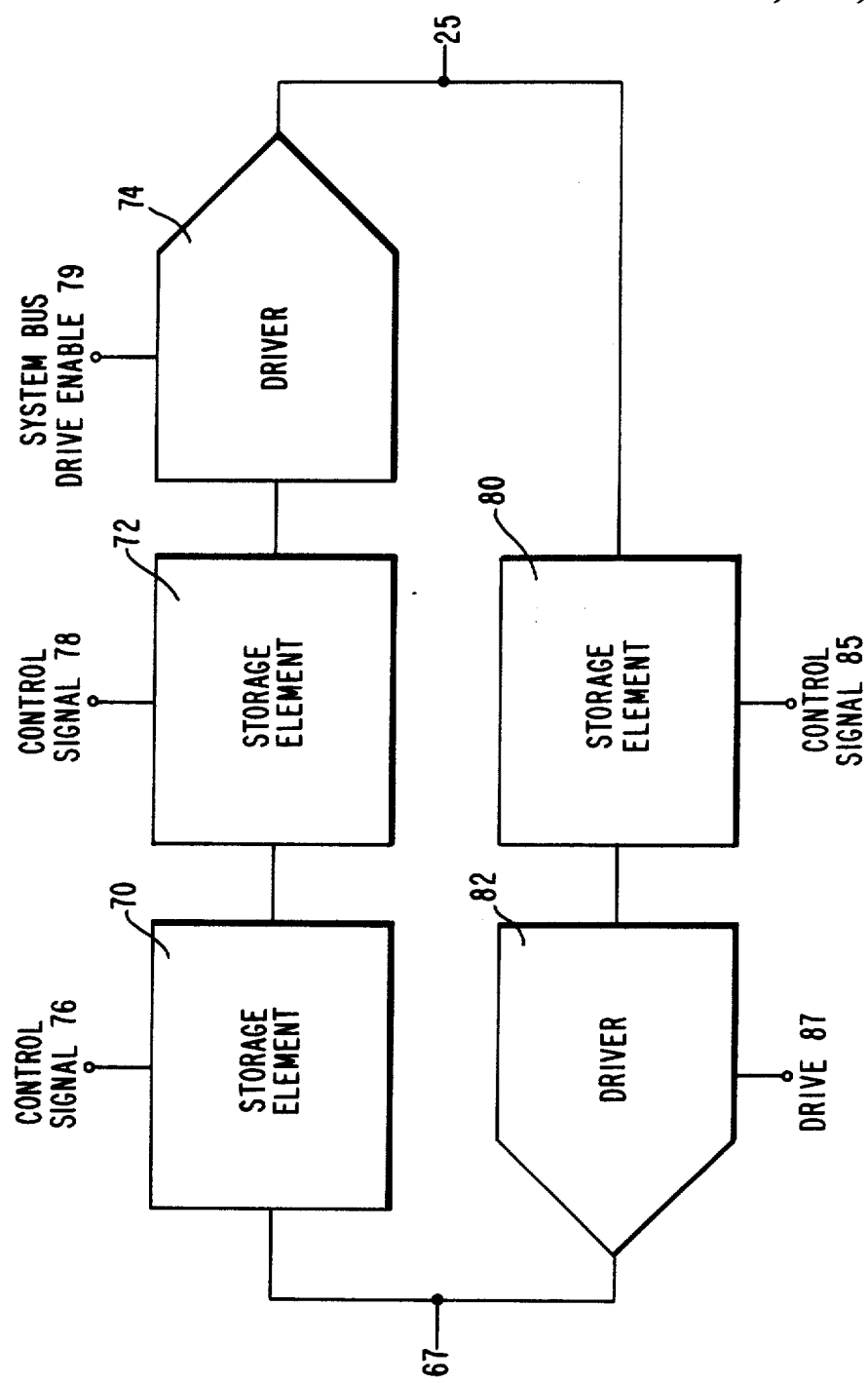
FIG. 4 is a block diagram of the data interface 61 used in the nodes of FIGS. 1 and 2.

FIG. 4 shows a preferred embodiment of data interface 61. Data interface 61 contains both temporary storage circuitry and bus driver circuitry to provide a bidirectional and high speed interface between each of the lines of node bus 67 and each of the lines of system bus 25. As shown in FIG. 4, data interface 61 preferably includes storage elements 70 and 72 and system bus driver 74 to provide a communication path from node bus 67 to system bus 25. Data interface 61 also includes storage element 80 and node bus driver 82 to provide communication path from system bus 25 to node bus 67. As used in the description of data interface 61, the term "storage element" refers generally to bistable storage devices such as transparent latch or a master-slave storage element, and not to a specific implementation. Persons of ordinary skill will recognize which types of storage elements are appropriate.

As shown in FIG. 4, storage element 70 has an input connected to receive data from node bus 67 and an output connected to the input of storage element 72. The output of storage element 72 is connected to an input of system bus driver 74 whose output is connected to system bus 25. Storage elements 70 and 72 are controlled by node bus control signals 76 and 78, respectively, which are derived from the timing signals generated by clock decoder 63. Storage elements 70 and 72 provide a two-stage temporary storage for pipelining data from node bus 67 to system bus 25. Different numbers of storage stages can also be used.

System bus driver 74 is controlled by system bus drive enable 79. According to the state of the system bus drive enable 79, the input of system bus driver 74 either is coupled to its output, thereby transferring the data at the output of storage element 72 to system bus 25, or decoupled from that output. When system bus drive enable 79 decouples the input and output of the system bus driver 74, system bus driver 74 presents a high impedance to system bus 25. The system bus drive enable 79 is also generated by clock decoder 63 in accordance with clock signals received from system bus 25 and control signals received from the node specific logic 65.

Storage element 80 has an input terminal connected to system bus 25 and an output terminal connected to an input of node bus driver 82. The output of node bus driver 82 is connected back to node bus 67. Storage element 80, preferably a transparent latch, is controlled by a system bus control signal 85 which is derived from the timing signals generated by clock decoder 63. A node bus drive signal 87 controls node bus drive 82 similar to the manner in which system bus drive signal 79 controls system bus driver 74. Thus, in response to node bus driver signal 87, node bus driver 82 either couples its input to its output or decouples its input from its output and provides a high impedance to node bus 67.

In order to explain how data is transferred over system bus 25, it is important to understand the relationship between system bus drive enable 79 and control signal 85. In the present embodiment, this relationship is shown in FIG. 3. System bus drive enable 79 is nominally driven from the beginning to the end of a bus cycle. The new data become available for receipt from system bus 25 at some time later in the bus cycle after driver propagation and bus settling time has occurred. In the present embodiment, storage element 80 is a transparent latch. Control signal 85 is logically equivalent to clock C45. The bus timing assures that system bus 25 data is available for receipt sometime prior to the deassertion of control signal 85. Storage element 80 stores bus data that is stable at least a set-up time prior to the deassertion of control signal 85 and remains stable a hold time after the deassertion of control signal 85.

Node bus 67 is preferably a very high speed data bus which allows bidirectional data transfer between the node specific logic 65 and system bus 25 by way of data interface 61. In the preferred embodiment of node 60 shown in FIG. 2, node bus 67 is an interconnect system consisting of point-to-point connections between the system bus interface 64 and the node specific logic 65. In accordance with the present invention, however, there is no requirement for such point-to-point interconnection.

Figure 5:
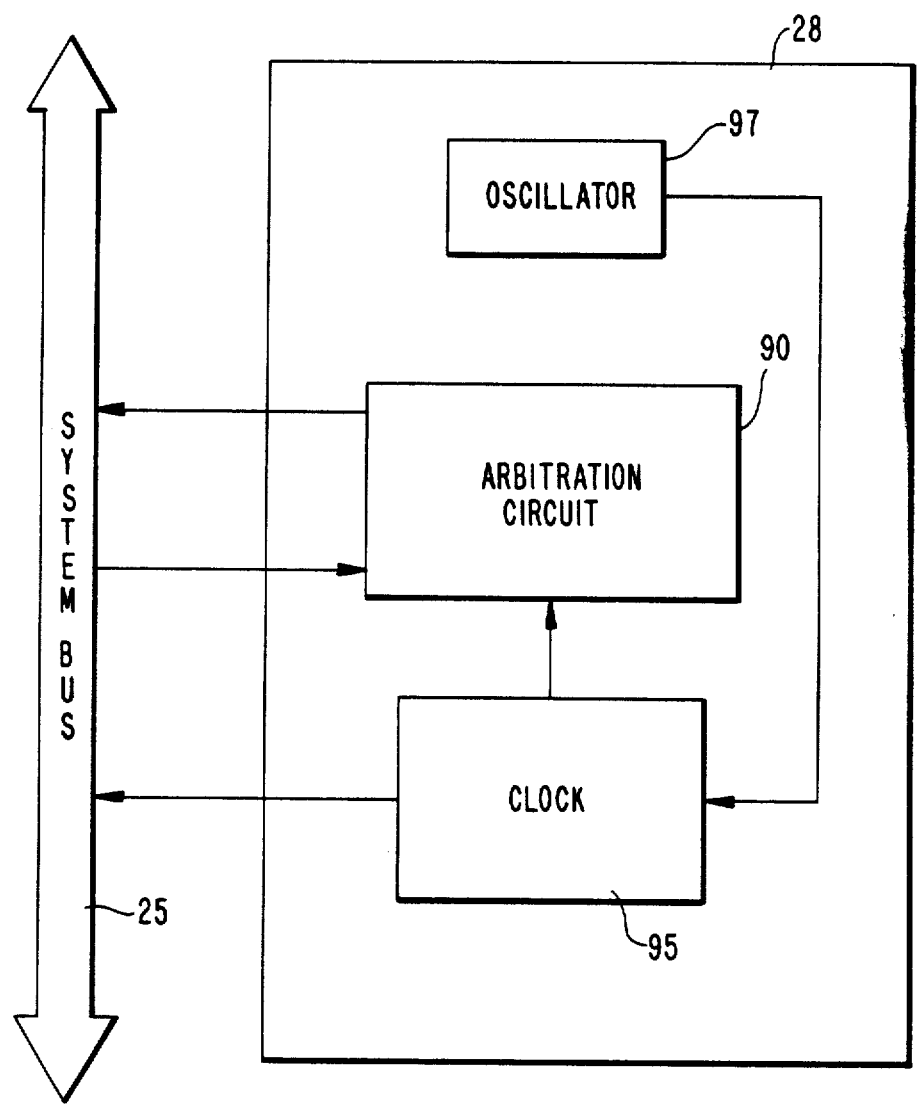
FIG. 5 is a block diagram of the arbiter in the data processing system of FIG. 1.

FIG. 5 shows a preferred embodiment of the central arbiter 28 which is also connected to system bus 25. Central arbiter 28 provides the clock signals for system bus 25 and grants ownership of the bus to the nodes on system bus 25. Central arbiter 28 preferably includes an arbitration circuit 90, a clock circuit 95, and a oscillator 97. Oscillator 97 generates the fundamental clock signals. Clock 95 provides timing signals for arbitration circuit 90 and the basic Time H, Time L, and Phase clock signals for timing on system bus 25. Arbitration circuit 90 receives the commander and responder request signals, arbitrates conflicts between nodes desiring access to system bus 25, and maintains the queues referred to above for the commander and responder requests. Arbitration circuit 90 also provides certain control signals to clock 95.

B. Discussion of Interlock Operations

As briefly discussed above, a number of different types of transactions are allowed on bus 25. In each case, the transaction is composed of one or more separate transfers from one node to another. When the responder node successfully receives a command transfer during one or more bus cycles, it generates an acknowledge confirmation at the beginning of the second bus cycle after each cycle of the transfer. Such acknowledgement signals do not indicate successful execution of the command contained in the original transfer, but merely indicate that the transfer was successfully placed in an input queue in the desired responder node. The transactions relevant to the present invention will be briefly described below.

A read transaction is used to move data in four-byte, eight-byte, sixteen-byte, or thirty two-byte blocks from a specific location in a responder node managing a region of address space to a commander node. In the preferred embodiment, memory and I/O operations are referenced to a common address space. A responder node can be either a memory node, a processor node, or an I/O node.

Interlock read transactions are similar to read transactions. However, the exact effect of an interlock read transaction depends on the state of lock tags in the responder node. Lock tags prevent access to locations or groups of locations in address space. The effect of lock tags can be understood by visualizing address space of system 20 as appearing across a metallic "blackboard." Lock tags operate like magnetic tags removeably placed on top of locations or groups of locations on the address space "blackboard." If the location in address space specified in an interlock read transaction is already covered with a lock tag, that is, if the specified address space is "locked," the responder node responds to the interlock read request with a "locked" response message and no data is returned. This signifies to the commander that the location in address space specified in the interlock read command is not accessible. This locked response message is transmitted to the commander after the responder node services the interlock read command and after the responder node can gain access to bus 25. Thus, the commander receives the locked response message at an unspecified time after the command transfer of the interlock read transaction.

If the specified location is not locked, that is, not associated with a lock tag, information stored in the address specified in the interlock read command is returned in a response message to the commander node which generated the interlock read command The responder node also attaches a lock tag to the location in address space specified in the interlock read command, thus denying access to the specified location in address space to subsequent interlock read commands.

The unlock write transaction is the complement to the interlock read transaction. When a commander node successfully completes the read and modify location in a read-modify-write operation, it must unlock the location in address space which it temporarily locked by an interlock read command. The commander accomplishes this operation by performing an unlock write transaction to the specified location in address space to write the appropriately modified data into the specified location. The responder node processes the unlock write command by unlocking the address space and writing the data as requested. The lock tag is then cleared.

The message transmitted over bus 25 during an interlock read command transfer includes data on sixty four data lines. That data contains a four-bit command field, a two-bit length field which specifies the number of words to be transferred from e.g., memory 39 to processor node 31, and a thirty-bit address field which specifies the address location in memory 39 from which data is desired to be read. Other lines of system bus 25 carrying information during an interlock read command include four function lines carrying a four-bit function code indicating a command transfer, six ID lines carrying a six-bit code identifying the commander node which initiated the interlock read command, and three parity lines.

As briefly discussed above, system bus 25 includes respond signals which are used by a receiver to indicate successful reception of information placed on the bus by a transmitter. In the preferred embodiment, the respond signals include three identical wire-ORed confirmation (CNF) lines. Three lines are provided since it is extremely important to the integrity of bus transactions that a commander know exactly what a responder has done in response to each command, particularly in the case of an interlock command or a write to an I/O register. Therefore, a receiver will send either a acknowledge (ACK) confirmation by asserting all three CNF lines or a no acknowledge (NACK) confirmation by not asserting all three CNF lines. Error correction logic is provided in the receiver to determine the true CNF status if all three CNF lines are not received by the receiver at the same logic level.

An ACK confirmation indicates that a responder has accepted information from one cycle of command transfer or that a commander has accepted information from one cycle of a response message. A read command transfer cycle resulting in an ACK confirmation indication indicates that the responder will return a read response message at some later time.

A NACK confirmation returned on the CNF lines indicates that no receiver has accepted the information from that bus cycle of the command transfer. This could be for three reasons: (1) a parity error has occurred on the system bus 25, (2) the receiver was temporarily unable to accept the command, for example, when the receiver's input queue is full, or (3) there is no responder node corresponding to the specified address.

The confirmation indications corresponding to a bus cycle are placed on the CNF lines by the receiver node at the beginning of the second cycle after cycle of the bus cycle.

An example of an interlock read transaction will be described in connection with FIG. 6. The horizontal axis at the top of FIG. 6 indicates successive bus cycles on bus 25. The labels appearing vertically along the left side of FIG. 6 indicate groups of lines contained in bus 25, that is, function lines, data lines, ID lines, confirmation lines, and arbitration lines. The entries in the matrix formed by the horizontal and vertical axes of FIG. 6 describe the type of data appearing on the specified bus lines during the specified bus cycles.

At bus cycle 0, a first commander node, for example, node 31 of FIG. 1, asserts its CMD REQ arbitration request line (one of the point to point lines connected to arbiter 28 and shown in FIG. 1) to arbiter 28. FIG. 6 thus indicates a "cmdr #1" request present on arbitration lines of system bus 25 at cycle 1. Assuming that no other node of higher priority is simultaneously requesting access to the bus, processor 31 obtains bus access on cycle 1 and transmits a message into system bus 25.

During cycle 1 information placed on the function lines of bus 25 indicates that the information on the bus is command (cmd) information. The data placed on data lines of bus 25 consist of command and address (c/a) data identifying the current transaction as an interlock read transaction and specifying the address in memory 39 from which data is to be returned to processor 31. The ID lines during bus cycle 1 contain the identification code of processor (commander/cmdr) node 31 currently transmitting on bus 25.

During bus cycle 2, no information is placed on bus 25 in connection with the present interlock read transaction.

At the beginning of bus cycle 3, which is two cycles (i.e., a predetermined time) after initiation of the interlock read transaction, memory node 39 transmits an ACK confirmation on the confirmation lines of bus 25 if memory 39 successfully received the command transfer transmitted during bus cycle 1. Memory 39 then places the command message in the input queue of memory 39.

The end of bus cycle 3 constitutes the end of the first transfer in the interlock read transaction. Due to the pended nature of transactions on bus 25, the time when the requested information will be returned from memory 39 to processor 31 is not precisely defined. The response time depends on the length of time required by memory 39 to process the request and the amount of time necessary for system bus 25 to handle additional traffic on bus 25 generated by other nodes. The unspecified nature of the time between the two transfers of an interlock read transaction is indicated by the dotted line in FIG. 6 between bus cycles 3 and 4. Thus, although subsequent information is indicated by FIG. 6 to occur over bus cycles 4 through 7, it is to be understood that this is only a specific example of the timing involved in an interlock read transaction and that the second transfer of such transaction could occur in any subsequent cycle of bus 25.

Memory 39 processes the interlock read command by removing the interlock read transfer message from its input queue in turn and examining the address information contained in the transfer. The information is compared to address values stored in lock tags to be more completely described. If there is a match between the stored address values and the address information of the interlock read transfer, this is an indication that the desired address location has been locked by a previous interlock read command. Memory 39 then generates a locked response message including a "locked" function code, along with other information required for a response message, in an output queue of memory node 39.

If the comparison of address values stored in lock tags with the interlock read transfer address information does not yield a "hit," that is, if the transferred address does not correspond to any stored address, memory node 39 constructs a response message consisting of a valid read response node such as "good read data" (grd0) code for functions lines, the contents of the specified address location for the data lines, and the commander identification code of the commander node which initiated the interlock read command for the ID lines. This response message is loaded into the output queue of memory node 39.

When memory 39 has processed the interlock read transaction and generated a response message within its output queue in a manner to be more completely described, memory 39 asserts its RES REQ request line (another point-to-point line shown in FIG. 1) to arbiter 28. The arbitration lines thus carry a responder request (resp) indication as shown in FIG. 6 at bus cycle 4. Assuming that no other nodes have higher priority at this time, arbiter 28 grants memory 39 access to bus 25 during bus cycle 5. Memory 39 transmits the response message including "good read data" (grd0) signal onto function lines of system bus 25, eight bytes (i.e. 64 bits) of data over the data lines of system bus 25 from the memory locations specified by the address field of the initial transfer from processor 31 to memory 39, and the ID of processor 31 onto the ID lines of bus 25 to associate the returning data with the commander (i.e. processor 31) which initially issued the interlock read request.

During bus cycle 6, no traffic appears on system bus 25 related to this interlock read transaction. Finally, the interlock read transaction concludes in bus cycle 7 when processor 31 transmits an ACK confirmation onto the confirmation lines of bus 25.

Figure 6:
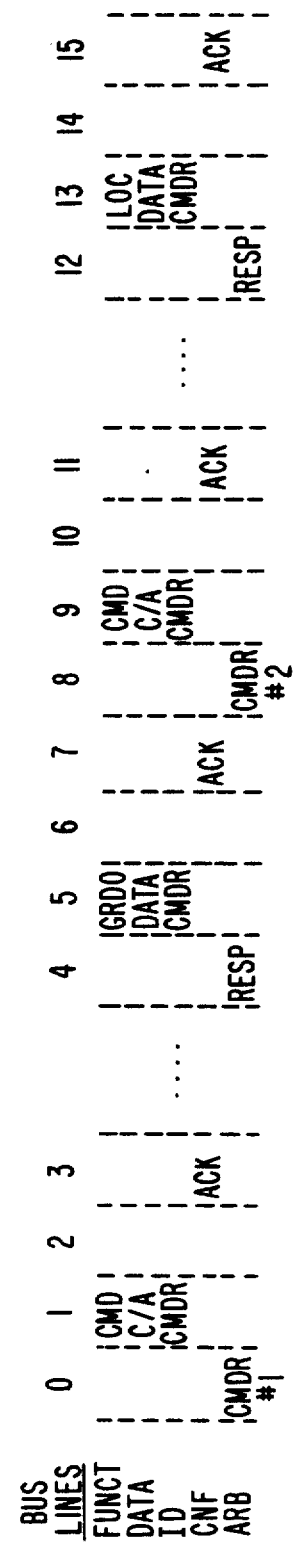
FIG. 6 is a timing diagram showing signals appearing on the system bus of FIG. 1 during an interlock read transaction.

A second interlock read transaction to the same specified location in memory will result in data appearing on bus 25 as shown in cycles 8-15 of FIG. 6. At cycle 8, a second commander (cmdr #2) initiates a commander request to arbiter 28. Bus cycles 9-12 result in traffic on bus 25 identical to cycles 1-4. However, memory 39, upon processing of the received interlock read command, found a match between the address values stored in lock tags and the address transmitted with the interlock read command. Accordingly, a LOC response is presented on function lines of bus 25 at, for example, cycle 13. Bus cycles 14 and 15 are identical to cycles 6 and 7.

C. Description of Processor 31

Figure 7:
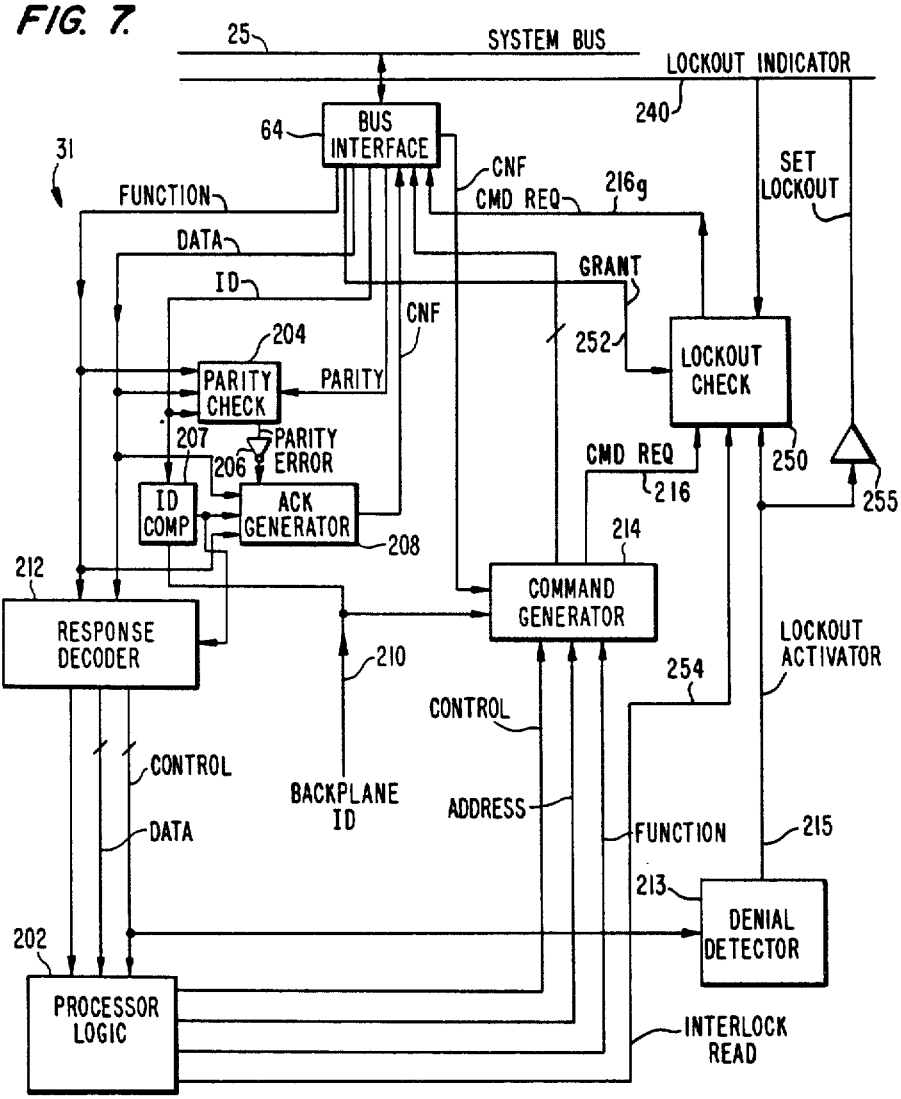
FIG. 7 is a block diagram of a processor node in the data processing system of FIG. 1.

Referring now to FIG. 7, there is shown a more detailed block diagram of certain elements of the node specific logic 65 in processor 31. Processor node 31 includes, as do all the nodes, bus interface circuit 64. Processor node 31 also includes a processor logic 202. Processor logic 202 includes central processing unit (CPU) circuitry required to execute software in a manner well known to those skilled in the art. Processor logic 202 also generates command and address information as required by system 20 to execute the necessary application functions as well as to control transfers over system bus 25.

Processor node 31 also includes a parity error check circuit 204 which monitors information on the function, data, ID, and parity lines of system bus 25 received from bus interface circuit 64 to perform a parity check on those signals in a manner well known in the art. A detected parity error will result in the generation of a parity error indication on signal line 206.

The information on the ID lines is monitored by a comparator circuit 207 which is also supplied with the identification code of processor 31 from a hard-wired connection 210 on the backplane which is determined by the position of processor 31 in a mounting cabinet. The comparison result from comparator 207 is supplied, along with information on the parity error signal line 206, to an acknowledge confirmation generator 208. If no parity error was detected and if the ID code received over bus 25 for a response message matches the ID code of processor 31, ACK indications are transmitted over the CNF lines of bus 25 by an acknowledge indication generator 208 at the beginning of the second bus cycle after each cycle of a response transfer directed to processor 31.

Information on function and data lines of bus 25 is supplied through bus interface 64 to a response decoder 212. Decoder 212 is enabled by comparator 207 when a message over bus 25 is intended for processor 31. This is determined by a positive comparison result from comparator 207. If decoder 212 is enabled by comparator 207, decoder 212 extracts function codes from function lines of system bus 25, and for certain function codes, supplies command and data information from data lines of bus 25 to processor logic 202 for appropriate action.

In accordance with the present invention, the processor includes means responsive to a resource denial indication for asserting a lockout activator when access commands from the processor receive inadequate response from a resource node according to predetermined lockout assertion criterion. As embodied herein, such means comprises a denial detector circuit 213. Denial detector circuit 213 is responsive to function information derived by response decoder 212 from the function lines of bus 25 to assert lockout activator 215 when a locked response code is received in a response message from memory 39 (FIG. 1) as decoded by decoder 212. The lockout activator 215 is supplied to a driver 255 such that when lockout activator 215 is asserted, processor 31 asserts a lockout indicator 240.

In accordance with the present invention, the processor also includes means for transmitting access commands over the bus to memory. As embodied herein, the transmitting means comprises a command generator 214. When processor 31 desires to initiate a transaction on bus 25, command, address, and data information is supplied to command generator 214, along with the ID of processor 31 supplied from connection 210. Command generator 214 prepares a command message and asserts the commander request (CMD REQ) arbitration line 216 for processor 31. A line 216g, which is a gated version of CMD REQ line 216 conditioned by lockout check circuit 250 to be described in greater detail hereinafter, indicates to arbiter 28 (not shown in FIG. 7) that processor 31 desires access to bus 25 to transmit a commander message. Using an arbitration system, arbiter 28 grants bus access to processor 31 at an unspecified time after the original interlock read transfer.

Upon being granted access, command generator 214 causes bus interface 64 to transmit the command message from command generator 214 to system bus 25.

The responder node to which the interlock read command is directed will generate an acknowledge confirmation two cycles after the interlock read command transfer. As shown in FIG. 7, command generator 214 monitors CNF lines to detect the presence of an ACK confirmation on the CNF bus lines two bus cycles after a command transfer transmitted by a processor 31 over system bus 25. Failure to detect the presence of an ACK confirmation will result in appropriate corrective action which, in the preferred embodiment, consists of the retransmission of the previous command. When the transfer is complete, the responder node will process the interlock read command and return a response message on system bus 25. Because of uncertainties due to traffic on system bus 25 and queue lengths, the responder node will generate a response message at an unspecified time after the command transfer.

System 20 includes a lockout indicator 240 which includes a wired-OR line. Lockout indicator 240 is operable when asserted to limit the generation of interlock read commands by processors on system 31. In the preferred embodiment, lockout indicator 240 is connected to all nodes. However, the invention does not require that lockout indicator 240 be connected to all nodes.

In accordance with the present invention, the processor includes lockout check means for monitoring the lockout indicator and for preventing generation of access commands by the processor according to a predetermined access gating criterion when the lockout indicator is in an asserted condition. Preferably, the lockout checkout means comprises means for preventing the processor from requesting access to the bus according to the predetermined access gating criterion. As embodied herein, the lockout check means comprises a lockout check circuit 250. Lockout check circuit 250 receives a grant signal 252 which is a line from bus interface 64 which is asserted at the time processor 31 is granted access to bus 25. Lockout check circuit 250 also receives an interlock read command indication 254 from processor logic 202, lockout activator 215 from lockout detector 213, and a signal from lockout indicator 240. Lockout check circuit 250 monitors the status of lockout indicator 240 such that under certain conditions when lockout indicator 240 is asserted, lockout check circuit 250 suppresses the generation of CMD REQ level on line 216g to arbiter 28 to prevent processor 31 from generating an interlock read transfer.

In an alternative embodiment, the lockout check means may be incorporated in a state machine formed by a programmable logic array.

D. Description of Memory 39

Figure 8:
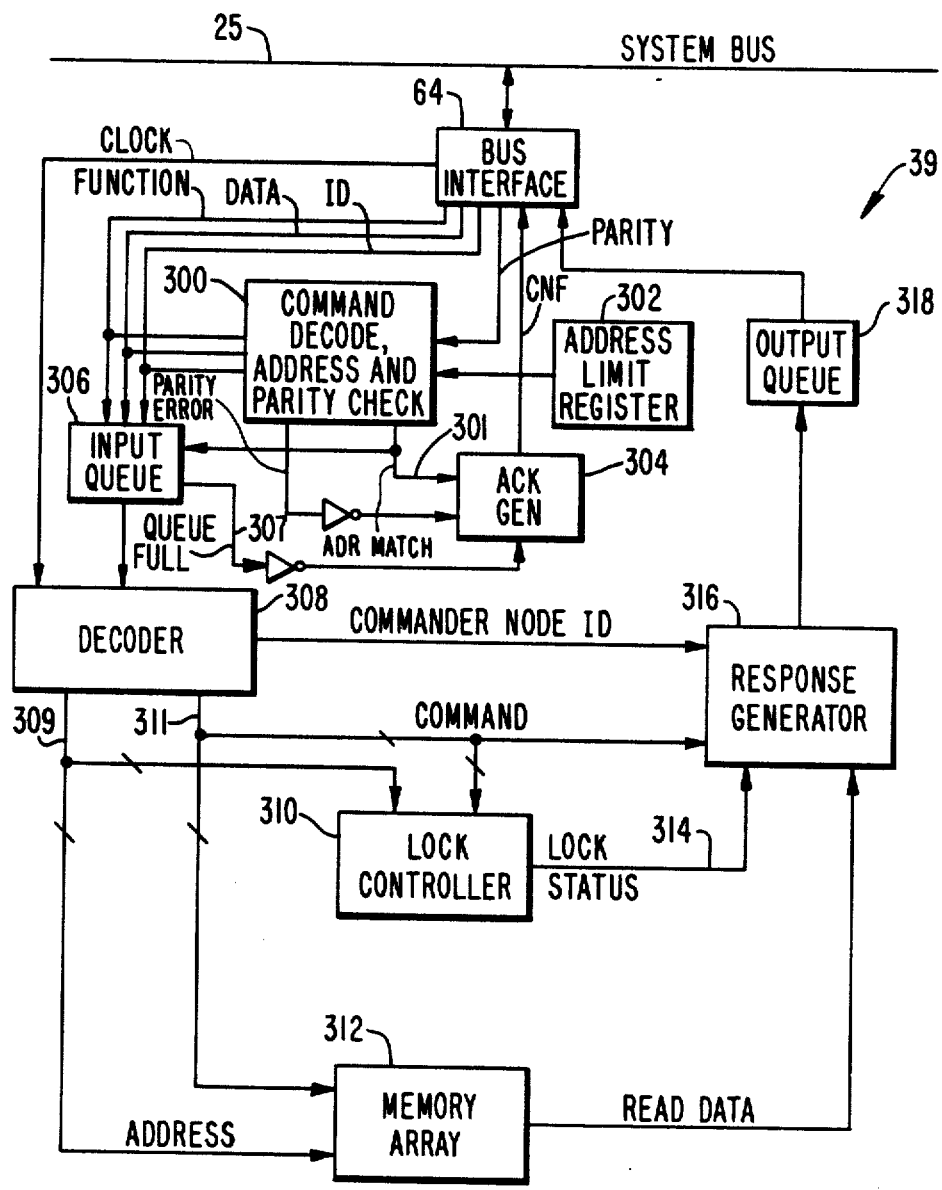
FIG. 8 is a block diagram of a memory node in the data processing system of FIG. 1.

FIG. 8 shows a block diagram of memory 39 which may function as a responder node. As can be seen in FIG. 8, memory 39 includes a command decode and address and parity check circuit 300. Circuit 300 is connected to the bus function, address, and identifier lines and performs a parity check in a well-known manner. Circuit 300 also compares the information on bus address lines to the limits of address space served by memory 39, as supplied from a register 302, and supplies the results of this comparison on an address match line 301. If the address information received over bus 25 is within the range of address space served by memory 39 and if no parity error has occurred, an acknowledge generator 304, connected to circuit 300, will generate an ACK confirmation by asserting all three CNF lines at the beginning of the second cycle after the transmission cycle of a transfer destined for memory 39.

Memory 39 includes an input queue 306 for storing messages (consisting of function, ID, and data information) received from transfers over bus 25, via bus interface unit 64. Input queue 306 permits such messages, received at high speed over bus 25, to be stored until the relatively slower logic of memory 39 allows such messages to be acted upon. Input queue 306 is enabled to store a message from bus 25 when address information appearing in the data field of a message on bus 25 is within the limits of address space for memory 39, as determined by the level on address match signal 301.

The output of input queue 306 is supplied to a decoder 308 which extracts address and command information from messages stored in input queue 306. Although decoder 308 supplies multiple indications to decode the various commands and provides address information on a set of parallel signal lines, the address and command outputs of decoder 306 are respectively shown in FIG. 8 as bundled lines 309 and 311 for purposes of clarity.

In accordance with the invention, the memory comprises means for processing access commands and, preferably, for processing exclusive access commands. As embodied herein, such processing means comprises a lock controller 310 and a memory array 312. Lock controller 310 is described more completely in the aforementioned copending U.S. Pat. Application Ser. No. 07/044,954, the disclosure of which is hereby expressly incorporated by reference. The address and command information is supplied to lock controller 310 which assists in processing interlock read and unlock write commands. Address and command information from decoder 308 is also supplied to memory array 312. Memory array 312 responds to read and write commands to read data from and write data to locations in array 312 specified by address information received from decoder 308. As is well known in the art, information is stored in memory array 312 in a plurality of discrete locations identified by addresses which may be specified by read and write commands supplied to the array 312.

Lock status signal 314 from controller 310 and memory data from memory array 312 are supplied to a response generator 316 which generates an output response message. Response messages from generator 312 are supplied to an output queue 318 for storage until memory 39 obtains access to the bus through the arbitration process described previously.

In accordance with the present invention, the memory includes means for transmitting a resource denial indication when the processing means is prevented from responding to the access commands. As embodied herein, the transmitting means comprises in memory 39, a response generator 316 and an output queue 318. Response generator 316 prepares a response message based on data received from memory 312, the level of lock status signal 314 received from controller 310, and command and ID information received from decoder 308. The response message prepared by generator 316 is either of two types, depending on whether memory 39 is permitted to supply the requested data. If the command being responded to is a non-interlock read command, or if the command is an interlock read command and lock status signal 314 is not asserted, response generator 316 prepares a first type of message including the requested contents of the specified location in memory 312. However, if the command is an interlock read command and the lock status line 314 is asserted, response generator 316 prepares the second type of message with a "locked" code for the function lines indicating that the specified address of the interlock read command was in a locked condition and that the requested data is therefore not provided in the response message transmitted by memory 39 in response to the received interlock read command.

When generator 316 has compiled the response message, it is supplied to output queue 318. Output queue 318 alerts bus interface 64 that memory 39 desires access to bus 25. The response message is stored in output queue 318 for an unspecified time until such access is obtained.

When memory 39 is granted access to bus 25, the response message contained in output queue 318 is placed on system bus 25 for transmission to the commander node which originally generated the command. Since it is not known at what time memory 39 will complete the execution of the command originally transmitted by the commander node and since it is further uncertain at what time memory 39 will obtain access to bus 25 to provide either the requested data or the lock status information, the lock status information corresponding to the interlock read command will appear on the function lines of bus 25 at the commander node at an unspecified time subsequent to initiation of the original interlock read command.

E. Description of Lockout Check Circuit 250 and Lock Detector 213

Figure 9:
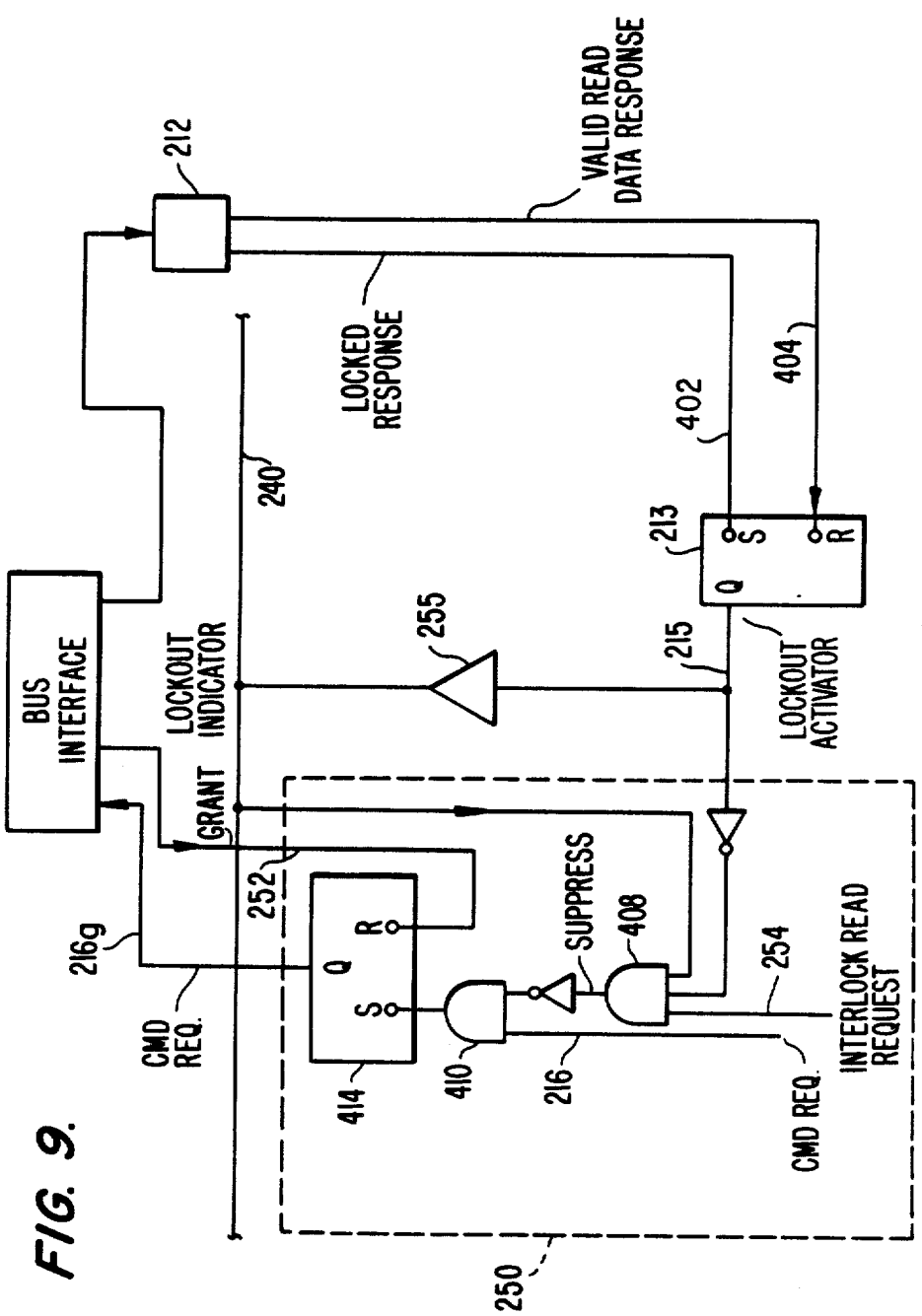
FIG. 9 is a block diagram of a lockout check circuit in the processor node of FIG. 8.

In accordance with the invention, the processor includes means responsive to a resource denial indication for asserting a lockout activator when access commands from the processor have received inadequate response by the memory according to a predetermined lockout assertion criterion. In accordance with another aspect of the invention, the processor comprises means responsive to the resource denial indication for asserting a lockout activator when access commands from the processor have received inadequate response by the memory according to the predetermined lockout assertion criterion. As embodied herein, such asserting means comprises denial detector circuit 213 responsive to a locked response which, in the preferred embodiment, constitutes a resource denial indication. FIG. 9 shows a block diagram of denial detector circuit 213 and lockout check circuit 250.

Decoder 212 supplies control lines 402 and 404 respectively indicating the presence of a locked response or a valid read data response. Locked response signal 402 is supplied to the set terminal of denial circuit 213 which in the preferred embodiment is a set-reset storage element, the reset terminal of which is connected to valid read data response signal 404. The output of storage element 213 constitutes lockout activator 215 which is supplied to driver 255 such that lockout indicator 240 is asserted by denial detector circuit 213 whenever a locked response is received by processor 31 over bus 25.

The receipt of a single locked response by processor 31 constitutes a predetermined lockout assertion criterion. That is, a single locked response is interpreted by processor 31 as an indication that processor 31 is not achieving or maintaining adequate access to memory 39. It is to be understood that invention is not limited to the specific lockout assertion criterion employed in the preferred embodiment, but that other criteria may be employed. For example, a counter could be used in place of storage element 213 such that lockout indicator 240 would only be set when processor 31 receives a plurality of locked responses, for example, three locked responses. Alternatively, a timer could be provided as a denial detector circuit, such that lockout indicator 240 would be set if processor 31 receives locked responses for more than a predetermined time or if processor 31 does not receive a valid data response for more than a predetermined time.

Lockout activator 215 is also connected to lockout check circuit 250. Lockout check circuit 250 includes a three-input AND gate 408. The first input to AND gate 408 is lockout indicator 240. The second input to AND gate 408 is the inverted level of lockout activator 215. The third input to AND gate 408 is interlock read line 254 from processor logic 202, the assertion of which indicates that an interlock read transaction is currently being requested by processor logic 202.

The output of AND gate 408 constitutes a "suppress" indicator which is supplied in inverted form to a two-input AND gate 410. The other input of AND gate 410 is CMD REQ (commander request) line 216 from command generator 214. The output of AND gate 410 is supplied to the set terminal of a storage element 414. The reset terminal of storage element 414 is supplied by grant signal 252 supplied from bus interface 64 (FIG. 7) which, when asserted, indicates that procesor 31 has access to bus 25.

Denial detector 213 and lockout check circuit 250, along with lockout indicator 240 provide a method and apparatus for assuring adequate access to memory 39 by processor nodes including node 31. When a locked response is received from memory 39 by processor 31 in response to an interlock read command, this is an indication that processor 31 has been denied access to a portion of memory 39. By setting lockout indicator 240, processor 31 can cause other processing nodes to restrict their generation of new lockout read commands. Specifically, upon receipt of a locked response by processor 31 and the subsequent assertion of lockout indicator 240, no processor node connected to lockout indicator 240 which had not already requested bus access for an interlock read command prior to assertion of lockout indicator 240 will be permitted to generate a new interlock read command. This is accomplished by the suppression of the CMD REQ line by AND gate 408. This suppression takes place if the following conditions, constituting predetermined access gating criteria of the preferred embodiment, are present: an interlock read operation is beinq requested by the processor (i.e., line 254 is being asserted), (2) the lockout activator 215 for this node is not currently asserted, and (3) lockout indicator 240 is asserted.

Other access gating criteria could of course be provided. For example, suppression of the CMD REQ line could be conditional on the failure of processor 31 to acquire a valid read data response for more than a predetermined time.

It is not necessary that denial detector circuit 213 and lockout circuit 250 both be present in lock commander node. That is, it may be desired to provide a commander node which sets lockout indicator 240 but does not to prevent generation of access commands or access denial commands.

An example of the operation of the preferred embodiment of the present invention on a multiple node system is shown in FIG. 11. FIG. 11 illustrates characteristics of four processor nodes on a system similar to system 20, specifically, nodes 15, 7, 6, and 2, as the nodes implement read-modify write operations using an interlock sequence consisting of a successful interlock read transaction and an unlock write transaction. The far left column indicates an arbitrary transaction number on bus 25. The next three columns at the left of FIG. 11 respectively show the node which is the commander during this transaction, the type of command information being placed on the bus by that node, and the response message returned by memory 39 in response to the node command. The next column of FIG. 11 indicates those nodes which are asserting lockout indicator 240 at a given point in time The columns numbered 15, 7, 6, and 2 indicate the status of the respective nodes 15, 7, 6, and 2 at the end of each time. The numbering of nodes in FIG. 11 refers to their physical position in a cabinet and not to reference characters in the drawings.

Prior to the start of transaction #1 shown in FIG. 11, that is, the top row of FIG. 11, nodes 15, 7, and 6 are all in the interlock read transaction generation state. That is, each of these nodes is attempting to gain access to the same location in memory 39. Node 2 is in the idle state.

In transaction #1, node 15 obtains access to bus 25 and places an interlock read request on the bus. Since node 15 is the first to gain access to the specified location in memory 39, such location is unlocked and memory 39 returns a valid read data (GRD) response on function lines of bus 25. No nodes are asserting lockout indicator 240 at that time. Since node 15 has received a valid read data response, it advances to the unlock write generation state. Nodes 7, and 6 remain in the interlock read transaction generation state.

In transaction #2, of FIG. 11, node 7 obtains access to the bus and initiates an interlock read transaction to the same memory location. Since node 15 had previously accessed that location and caused memory 39 to lock the location, memory 39 returns a locked (LOC) response message on function lines of bus 25. Since node 7 has now received a locked response, node 7 asserts lockout indicator 240 as shown in the third row of FIG. 11. Nodes 7 and 6 remain in the interlock read transaction generation state. Node 2 remains in the idle state.

At transaction #3, node 6 obtains access to the bus and initiates an interlock read transaction to the same location in memory 39. Since this location is still locked by virtue of the first interlock read operation of node 15, node 6 receives a locked response on function lines of bus 25. Node 6 also asserts lockout indicator 240. At this time, both nodes 7 and 6 are asserting lockout indicator 240. Node 15 remains in the unlocked write generation state, since it is not yet been able to obtain access to bus 25. Similarly, nodes 7 and 6 remain in the interlock read transaction generation state since they have not been able to successfully complete an interlock read transaction.

At transaction #4, node 15 obtains access to the bus and performs an unlock write transaction, thereby completing this interlock sequence. As shown in FIG. 11, no response message is required. Since nodes 7 and 6 both have unsuccessful interlock read requests pending, nodes 7 and 6 continue to assert lockout indicator 240. Node 15 returns to the idle state and nodes 7 and 6 remain in the interlock read generation state. At transaction #4, it is assumed that node 2 has decided to initiate an interlock read transaction. However, since such operation was not initiated prior to assertion of lockout indicator 240 by node 7, node 2 does not enter the transaction generation state, but enters the interlock read wait state (IRW).

At transaction #5, node 7 obtains access to the bus and initiates an interlock read transaction. Since the specified location in memory has been unlocked by the previous unlocked write transaction of node 15, node 7 is able to obtain access to the information contained in the specified memory location and memory 39 provides a valid read data response message on the function lines of bus 25. Since node 7 has successfully obtained its data, it no longer asserts lockout indicator 240 and it moves to the unlock write state. The successful interlock read transaction of node 7 causes memory 39 to set the lock bit of the specified location and memory. Node 6 continues to assert lockout indicator 240. Node 15 remains in the idle state. Node 6 remains in the interlock read generation state and node 2 remains in the interlock read wait state.

At transaction #6, node 6 obtains access to bus 25 and initiates an interlock read transaction. However, the specified location in memory is locked due to the immediately preceeding interlock read transaction of node 7. Thus, memory 39 returns a locked response to node 6 on the function lines of bus 25. Accordingly, node 6 continues to assert lockout indicator 240. At this time, node 15 has decided to attempt to initiate another interlock read transaction. However, since the initiation of this transaction did not take place prior to the assertion of lockout indicator 240, node 15 is placed in the interlock read wait state. Node 7, having completed the "read" and "modify" portions of the read-modify-write operation, is now in the unlock write generation state. Node 6 remains in the interlock read generation state and node 2 remains in the interlock read wait state.

At transaction #7, node 7 obtains access to bus 25 and performs an unlock write transaction, thereby completing this interlock sequence. No response message is returned. Since node 6 still has not successfully completed an interlock read transaction, node 6 continues to assert lockout indicator 240. Node 15 remains in the interlock read wait state, and node 7, having successfully completed all phases of the read-modify-write operation enters the idle state. Node 6 remains in the interlock read generation state and node 2 remains in the interlock read wait state. The lock bit of the specified location in memory 39 is reset.

At transaction #8 of FIG. 11, node 6 obtains access to bus 25 and initiates an interlock read transaction. Since the specified location in memory is now unlocked, due to the unlock write transaction of node 7 in the previous transaction, node 6 is successful in obtaining access to the specified location and memory 39 returns a valid read data response message. Since all nodes which have been attempting interlock read transactions have now successfully completed such transactions, no nodes are asserting lockout indicator 240. Nodes 15 and 2 can thus transition from the interlock read wait state to the interlock read generation state. Node 6 then enters the unlock write generation state.

At transaction #11 of FIG. 9, node 6 obtains access to bus 25 and performs an unlock write transaction and returns to the idle state. No response message is returned. Since no nodes have received a locked response, no nodes are currently asserting lockout indicator 240. Nodes 15, 7, and 2 all remain in the same state as the previous transaction.

Although the present invention has been described in detail with respect to interlock read/unlock write transactions and in which a memory node returns a resource denial indication due to interlock operations, the invention is not so limited. Rather, the invention may be applied to assure adequate access to other types of resources. For example, the invention may be applied to assure adequate access to the input queue of a memory node. Since a "no acknowledge" indication is returned to a processor node whose access command to memory was refused due to the memory input queue being full, such "no acknowledge" message constitutes a resource denial indication. Lockout indicator 240 can thus be used in combination with a lockout check means and means for transmitting and receiving "no acknowledge" indications, such that processor nodes can be inhibited, under appropriate conditions, from generating further access commands which would require processing by an input queue in memory. Thus, the demands on the memory can be reduced until such time as the memory node is able to reduce the backlog in its input queue.

In the same manner as discussed in detail above with respect to the interlock read unlock/write operations, the present invention can thus assure adequate access to the memory node input queue resource by all nodes. Similarly, adequate access to an input queue in adapter 41 (FIG. 1) can be assured using the principles of the present invention. Also, the invention can be applied to assure adequate access to control/status registers in nodes such as I/O controllers and processors.

It will be apparent to those skilled in the art that various modifications and variations can be made in the apparatus and methods of this invention without departing from the spirit or scope of the present invention. The present invention covers such modifications and variations which are within the scope of the appended claims and their equivalents.

What is claimed is:

1. A multiple node data processing system for assuring adequate access to a resource node by other nodes which generate access commands to gain access to said resource node, said system comprising:
   a pended bus;
   a resource node coupled to said pended bus and functioning as a responder node, said resource node including:
      processing means for processing said access commands, and
      indication transmitting means for transmitting a resource denial indication when said processing means is prevented from responding to said access commands;
   a plurality of second nodes, each coupled to said pended bus and functioning as a commander node and each including command transmitting means for transmitting said access commands over said pended bus to said resource node;
   a lockout indicator connected to one of said second nodes and responsive to said resource denial indication to transition from an unasserted condition to an asserted condition after receipt of at least one resource denial indication, according to a predetermined lockout assertion criterion; and
   lockout check means for monitoring said lockout indicator and for preventing generation of said access commands from at least one of said second nodes according to a predetermined access gating criterion when said lockout indicator is in said asserted condition.

2. A multiple node data processing system for assuring adequate access to a resource node by other nodes, connected to a pended bus, generating access commands to gain access to said resource node, said system comprising:
   a pended bus;
   a resource node coupled to said pended bus and functioning as a responder node, said resource node including:
      processing means for processing said access commands, and
      indication transmitting means for transmitting a resource denial indication when said processing means is prevented from responding to said access commands;
   a plurality of second nodes, each coupled to said pended bus and functioning as a commander node and each including command transmitting means for transmitting said access commands over said pended bus to said resource node;
   assertion means in one of said second nodes responsive to said resource denial indication for asserting a lockout activator when access commands from said second node have received inadequate response by said resource node according to a predetermined lockout assertion criterion;
   a lockout indicator connected to at least one of said second nodes and responsive to the assertion of said lockout activator to transition from an unasserted condition to an asserted condition when said lockout activator is asserted; and lockout check means for monitoring said lockout indicator and for preventing generation of said access commands by at least one of said second nodes according to a predetermined access gating criterion when said lockout indicator is in said asserted condition.

3. A system as recited in claim 2 wherein said lockout indicator comprises a signal line.

4. A system as recited in claim 3 wherein said lockout indicator signal line is connected to each of said second nodes through a wire-ORed connection.

5. A system as recited in claim 2 wherein said predetermined lockout assertion criterion constitutes receipt of a single resource denial indication.

6. A system as recited in claim 2 wherein said predetermined lockout criterion constitutes receipt of a plurality of resource denial indications.

7. A system as recited in claim 2 wherein said predetermined lockout criterion constitutes receipt of resource denial indications for more than a predetermined period of time.

8. A system as recited in claim 2 wherein said predetermined lockout criterion constitutes failure of said one of said second nodes to achieve access to said resource for more than a predetermined period of time.

9. A system as recited in claim 2 wherein said means for processing access commands comprises means for processing exclusive access commands, and said means for transmitting access commands comprises means for transmitting exclusive access commands.

10. A system as recited in claim 9 wherein said exclusive access commands comprise interlock read commands and said resource denial indication comprises a locked response.

11. A system as recited in claim 9 wherein said lockout check means comprises means for preventing one of said second nodes from requesting access to said bus according to said predetermined access gating criterion.

12. A system as recited in claim 11 wherein said preventing means are responsive to said lockout indicator, a lockout activator responsive to receipt of a resource denial indication, and a signal indicating an interlock read command is to be generated.

13. A method for assuring adequate access by a plurality of commander nodes to a responder node in a multiple node data processing system, said commander nodes each including means for generating exclusive access commands which restrict access to said responder node by other commander nodes generating subsequent exclusive access commands, said method comprising the steps of;

receiving a first exclusive access command at said responder node from a first one of said commander nodes;

receiving a second exclusive access command at said responder node from a second one of said commander nodes;

transmitting a locked response from said responder node to said second commander node in response to said second received exclusive access command;

operating a lockout indicator by said second commander node from an unasserted condition to an asserted condition after receipt of said locked response according to a predetermined lockout assertion criterion;

monitoring said lockout indicator by a third one of said commander nodes;

preventing generation by said third commander node of exclusive access commands according to a predetermined access gating criterion when said lockout indicator is in said asserted condition; and resetting said lockout indicator after said second commander node achieves access to said responder node.

14. A method as recited in claim 13 comprising the additional step of responding to said first exclusive access command from said first one of said commander nodes by setting a lock mechanism in said responder node to indicate acceptance of said first exclusive access command.

15. A method for assuring adequate access by a plurality of commander nodes to a responder node in a multiple node data processing system, said commander nodes each including means for generating access commands to said responder node said method comprising the steps of:

receiving a first access command at said responder node from a first one of said commander nodes;

receiving a second access command at said responder node from a second one of said commander nodes;

transmitting a resource denial indication from said responder node to said second commander node in response to said second received access command;

operating a lockout indicator by said second commander node from an unasserted condition to an asserted condition after receipt of said resource denial indication according to a predetermined lockout assertion criterion;

monitoring said lockout indicator by one of said commander nodes;

preventing generation by said one commander node of access commands according to a predetermined access gating criterion when said lockout indicator is in said asserted condition; and resetting said lockout indicator after said second commander node achieves access to said responder node.

16. A method as recited in claim 14 comprisinq the additional steps, subsequent to said generation preventing step, of receiving an unlock write command at said responder node, receiving a third access command at said responder node, and transmitting a response message from said responder node to indicate access was achieved to said responder node.

* * * * *